United States Patent
Chen

[19]

[11] Patent Number: 5,851,462
[45] Date of Patent: Dec. 22, 1998

[54] METHOD FOR MAKING A SURFBOARD

[75] Inventor: Ching Hsi Chen, Chang Hua Hsien, Taiwan

[73] Assignee: Sun Own Industrial Co., Ltd., Chang Hua Hsien, Taiwan

[21] Appl. No.: 925,299

[22] Filed: Sep. 8, 1997

[51] Int. Cl.[6] .......................... B29C 44/02; B29C 44/08
[52] U.S. Cl. ............................. 264/55; 264/51; 264/157
[58] Field of Search ............................ 264/55, 157, 51

[56] References Cited

U.S. PATENT DOCUMENTS

| | | | |
|---|---|---|---|
| 3,818,085 | 6/1974 | Marsland, Jr. et al. | 264/55 |
| 4,073,844 | 2/1978 | Wada et al. | 264/55 |
| 4,314,954 | 2/1982 | Ringdal | 264/55 |
| 4,976,902 | 12/1990 | Oberle | 264/55 |
| 5,234,638 | 8/1993 | Jang | 264/46.6 |
| 5,350,544 | 9/1994 | Bambara et al. | 264/321 |
| 5,417,898 | 5/1995 | Volpi et al. | 264/55 |
| 5,560,877 | 10/1996 | Yung et al. | 264/321 |
| 5,688,454 | 11/1997 | Chi | 264/321 |

FOREIGN PATENT DOCUMENTS

| | | | |
|---|---|---|---|
| 61-53030 | 3/1986 | Japan | 264/55 |
| 62-21525 | 1/1987 | Japan | 264/55 |

*Primary Examiner*—Allan R. Kuhns

[57] ABSTRACT

A method for making a surfboard includes a foamable material sheet cut into a number of panels and disposed in a mold device for hot pressing the panels and for expanding the panels to a prototype having a volume about 6 to 10 times greater than that of the panels. The prototype is then hot-pressed again for further expanding the prototype to the surfboard having a volume about 2 to 3 times greater than that of the prototype. The mold cavity includes tapered peripheral portions for forming tapered sides and tapered nose and tapered tail for the surfboard.

6 Claims, 5 Drawing Sheets

METHOD FOR MAKING A SURFBOARD

BACKGROUND OF THE INVENTION

1. Field of the Invention

The present invention relates to a method, and more particularly to a method for making a surfboard.

2. Description of the Prior Art

Typical surfboards are normally made of ethylene vinyl acetate copolymer (EVA) material. As shown in FIGS. 6–8, a board 1 of EVA material is first formed by such as a foaming process and is then cut along the lines 2 in order to form one or more prototypes 3 of the surfboards. The corners 31 of the prototypes 3 are then cut off along the lines 32 for forming the surfboards of required size and shape. The manufacturing processes are complicated. In addition, once the foamed EVA material on the outer peripheral portion of the surfboard is cut off, the EVA material may absorb water. In addition, organisms may grow in the EVA material and thus bad odor may be generated.

The present invention has arisen to mitigate and/or obviate the afore-described disadvantages of the conventional methods for making surfboards.

SUMMARY OF THE INVENTION

The primary objective of the present invention is to provide a method for making a surfboard without cutting process and without cutting the materials for forming the surfboard.

In accordance with one aspect of the invention, there is provided a method for making a surfboard, the method comprises providing and cutting a foamable material sheet into at least one panel, providing a first mold device having a mold cavity, engaging the panel in the mold cavity of the first mold device, hot-pressing the panel for heating the panel and for allowing the panel to expand to a prototype after the panel is removed from the first mold device, providing a second mold device having a lower mold and an upper mold, the lower mold and the upper mold including a mold cavity having a size greater than that of the prototype for allowing the prototype to expand to a greater size, engaging the prototype in the mold cavity of the lower mold and the upper mold, hot-pressing the lower mold and the upper mold for heating and foaming the prototype and for allowing the prototype to fill in the mold cavity of the lower mold and the upper mold, and cooling the second mold device for forming the surfboard.

The mold cavity of the lower mold and the upper mold of the second mold device includes tapered side portions for forming tapered sides and tapered nose and tapered tail for the surfboard.

A first hot-pressing means is provided for hot-pressing the first mold device, and a second hot-pressing means is provided for hot-pressing the lower mold and the upper mold of the second mold device. The first mold device and the second mold device each includes a plurality of passages for receiving heating medium and for heating the panel and the prototype. The first mold device is heated to a temperature ranging from 150° to 170° C., and is heated for 30 to 40 minutes. The second mold device is heated to a temperature ranging from 160° to 180° C., and is heated for 10 to 15 minutes.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 5:
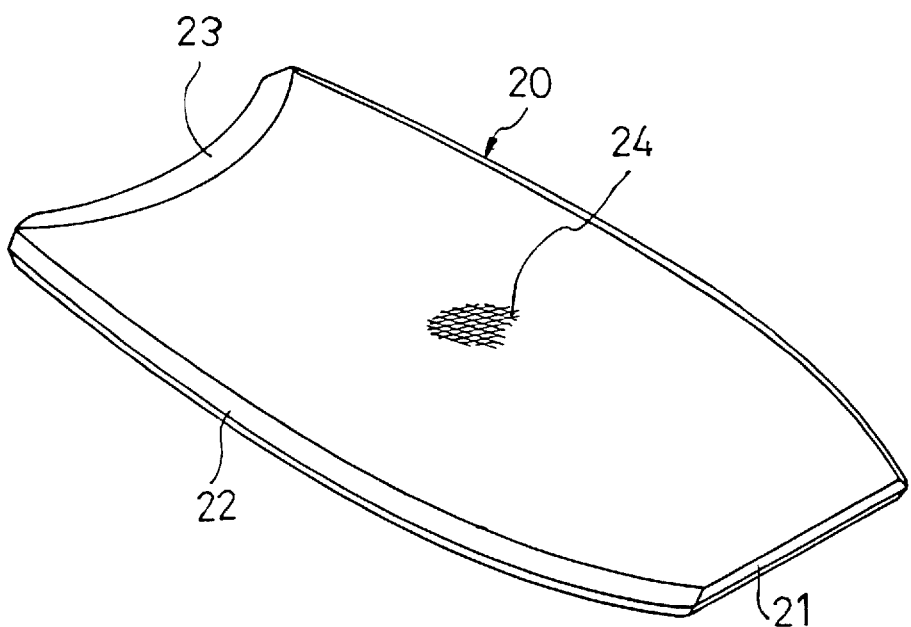
FIG. 5 is a perspective view of the surfboard made by the method in accordance with the present invention.

Referring to the drawings, and initially to FIG. 5, a method in accordance with the present invention is provided for making a surfboard 20 without cutting processes. The surfboard 20 includes two tapered side portions 22 and a tapered nose 21 and a curved and tapered tail 23 and a flat deck 24 where may be formed with trademarks, or flat or spatial patterns.

Figure 1:
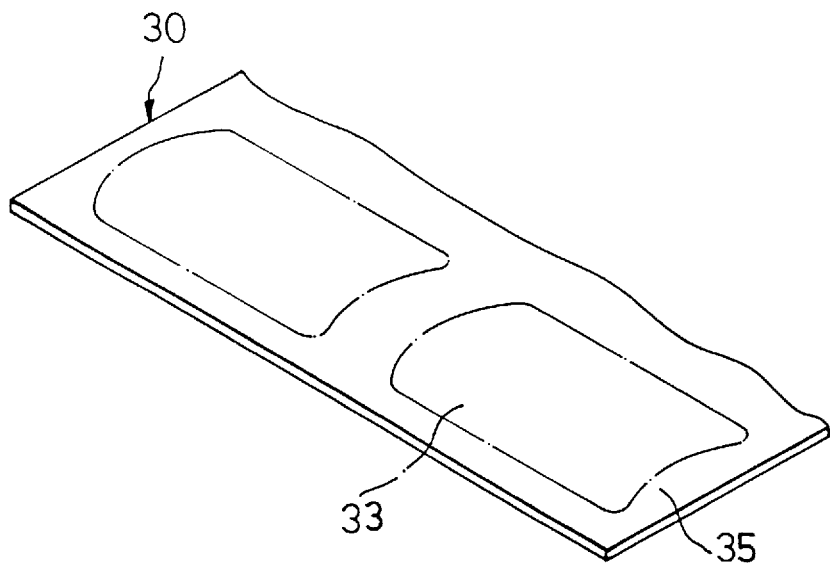
FIG. 1 is a perspective view of a plate for forming a number of panels.
Figure 2:
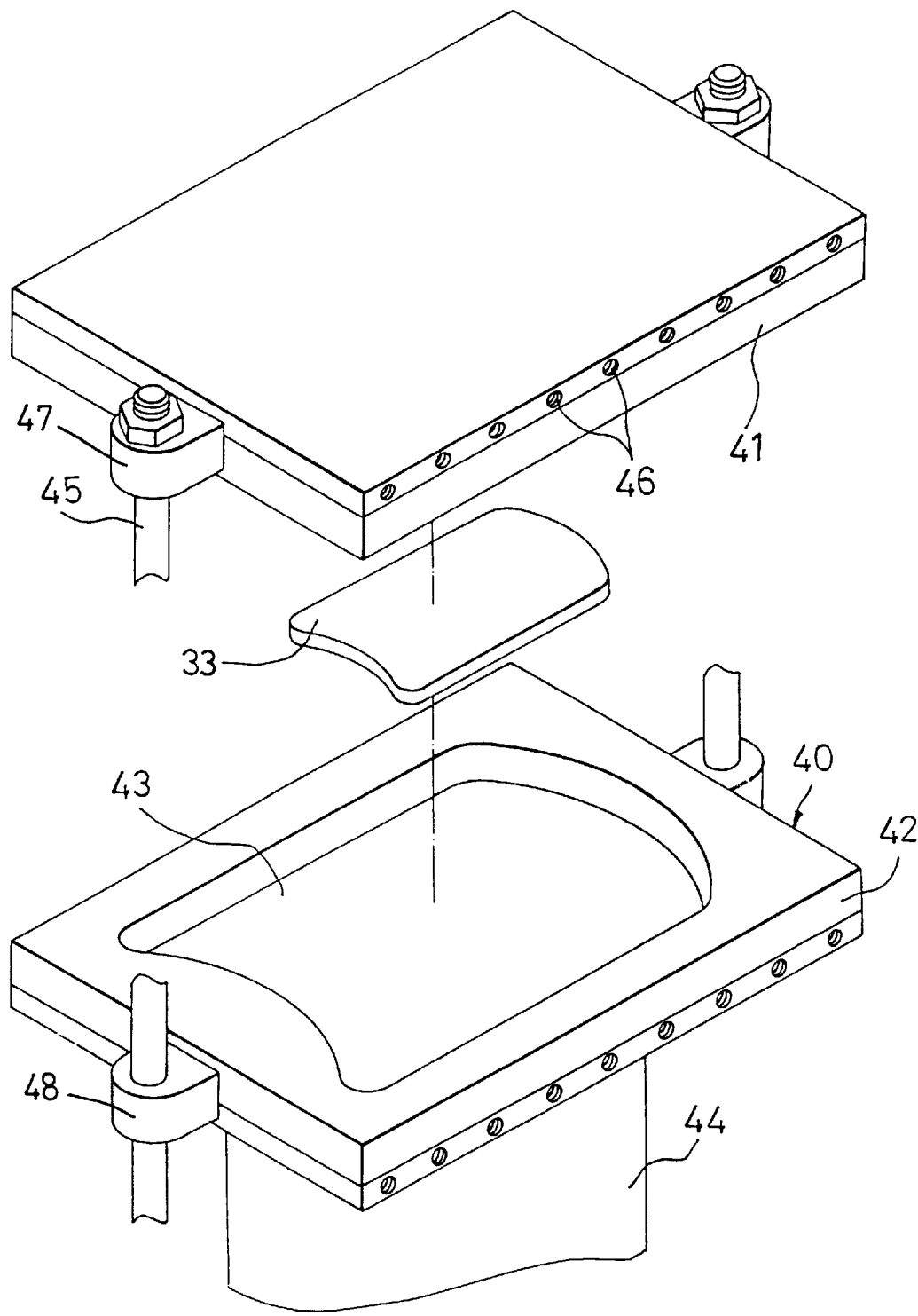
FIG. 2 is an exploded view of a mold device for performing the method in accordance with the present invention.

As shown in FIGS. 1 and 2, a sheet of foamable material 30 is used for making the surfboard 20 and may be selected from EVA or poly ethylene (PE), or the combination thereof. The foamable material 30 is first cut into a number of panels 33 having a shape similar the surfboard 20 to be formed. The cut off portion 35 of the foamable material 30 has not been foamed and may be used for forming the foamable material sheet 30 again after cut off, such that no material will be wasted. As shown in FIG. 2, a first mold device 40 includes an upper mold 41 and a lower mold 42 having a mold cavity 43 for receiving the panel 33. The lower mold 42 is secured on top of a base 44. Two or more fasteners 45 may engage with two pairs of extensions 47, 48 that may be extended from the molds 41, 42 for pressing the molds 41, 42 together. The fasteners 45 may be screws or bolts, or the piston rods of the actuators, such as hydraulic or pneumatic cylinders. The molds 41, 42 each includes a number of passages 46 for receiving heating medium, such as hot water or steam or heating tube etc., and for forming a heating device that may heat the molds 41, 42 and that may heat the panels 33 of the foamable material 30.

The heating medium or the molds 51, 52 are preferably heated to a temperature ranging from 150° to 170° C., and preferably heated for 30 to 40 minutes. The heating time may be shortened if the heating temperature of the heating medium is increased. After hot-pressing, the panel 33 may be melted and may expand to fill the mold cavity 43. After the heated panel 33 is removed from the mold device 40, the panel 33 may expand to a prototype 50 (FIG. 3) having a size about 6 to 10 times greater than that of the original panel 33. It is to be noted that the prototype 50 has been partially foamed and expanded such that a number of air holes or bubbles may be formed in the prototype 50. However, the prototype 50 has not been fully foamed and expanded yet at this moment.

Figure 3:
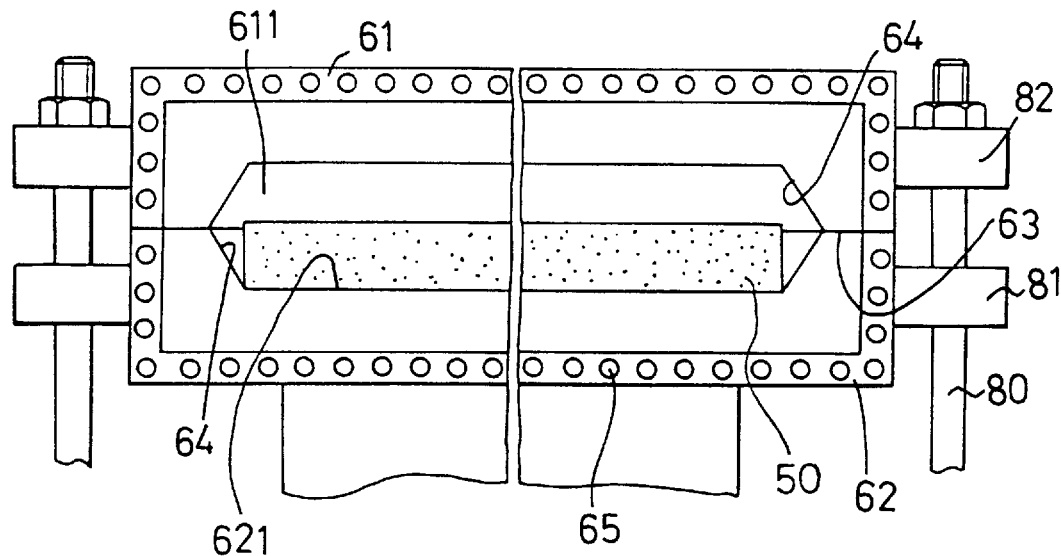
FIGS. 3, 4 are cross sectional views of the mold device, illustrating the processes of the method.
Figure 4:
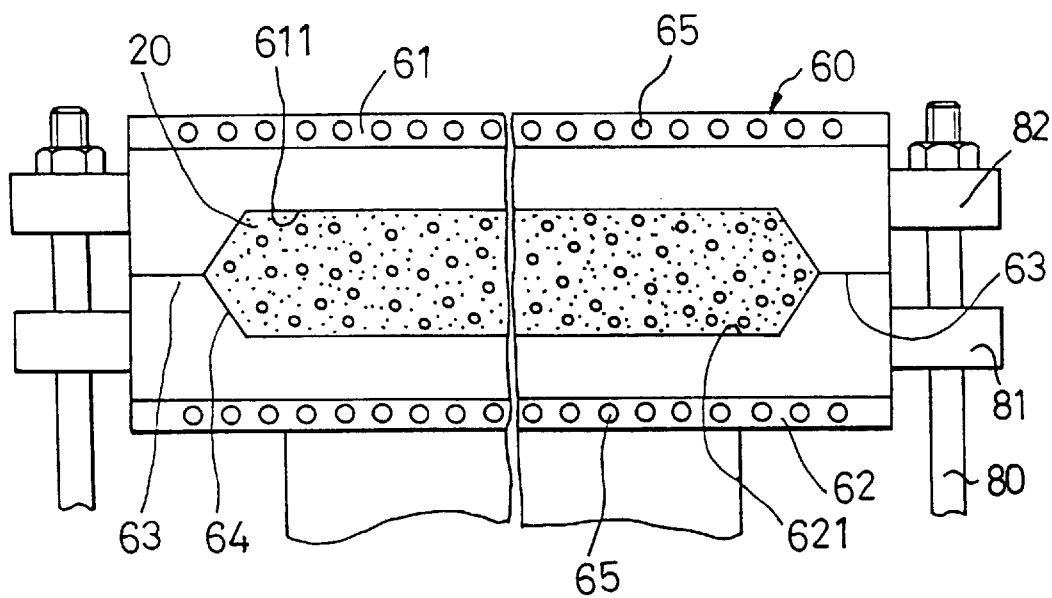
Figure 6:
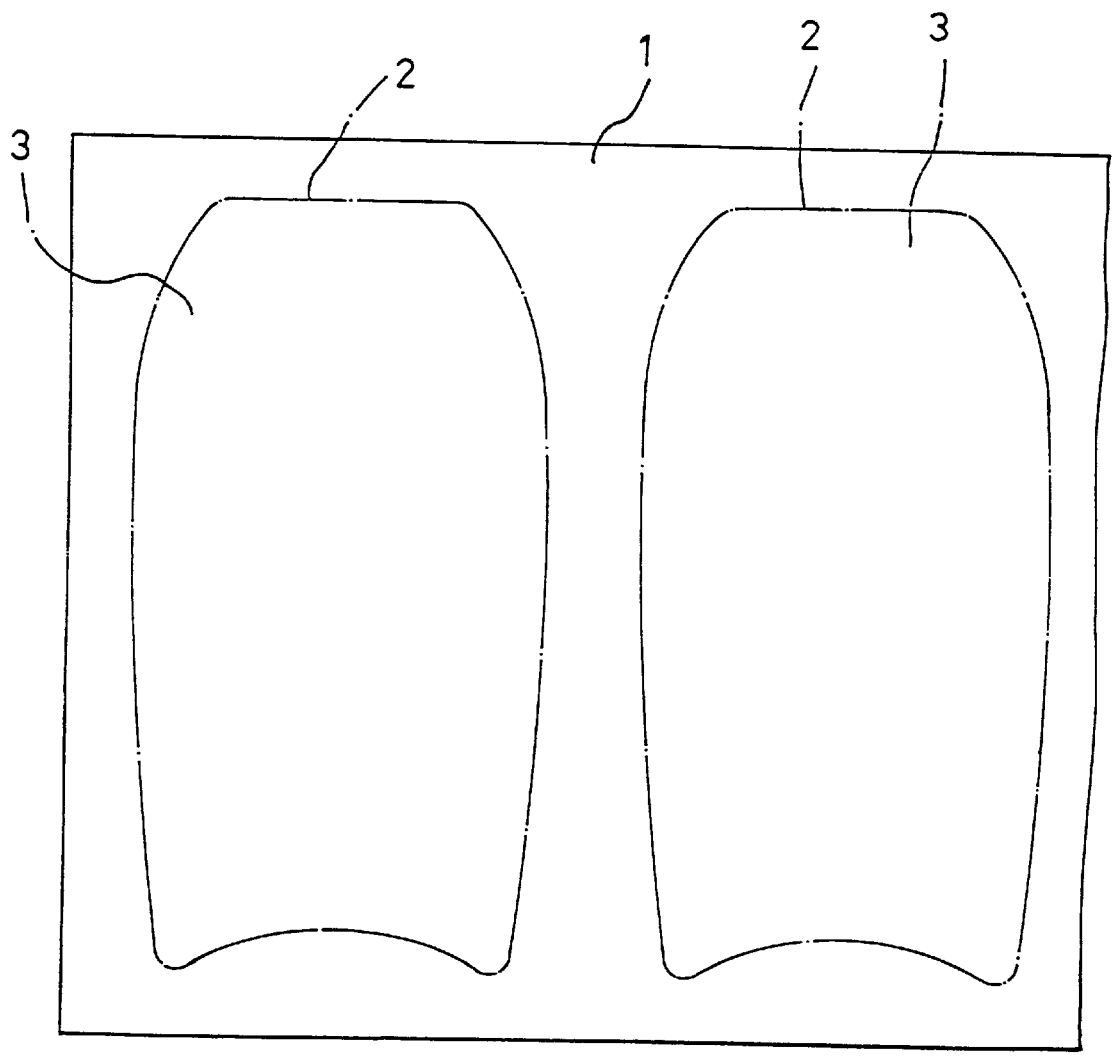
FIG. 6 is a partial plane view showing a board for forming the prototypes of the surfboards of the typical manufacturing method.
Figure 7:
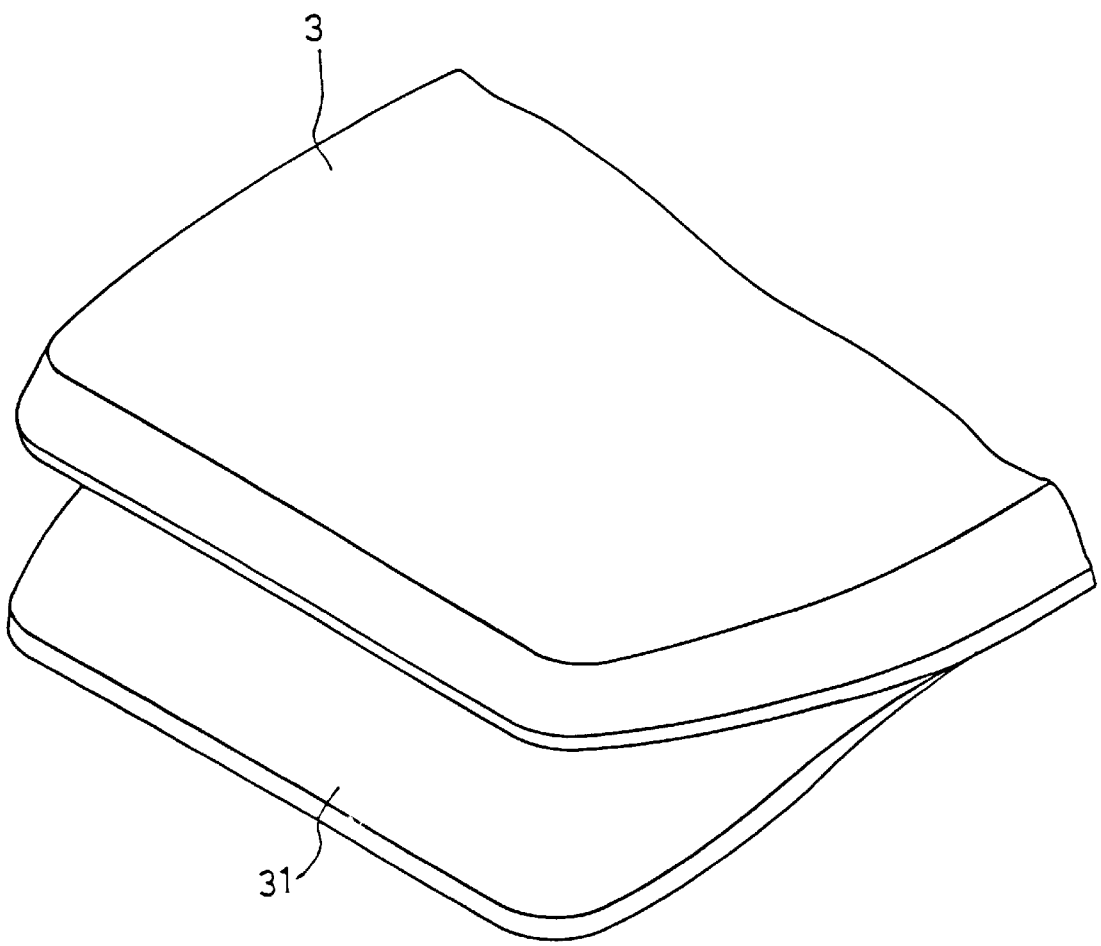
FIG. 7 is a partial perspective view of the typical surfboard.
Figure 8:
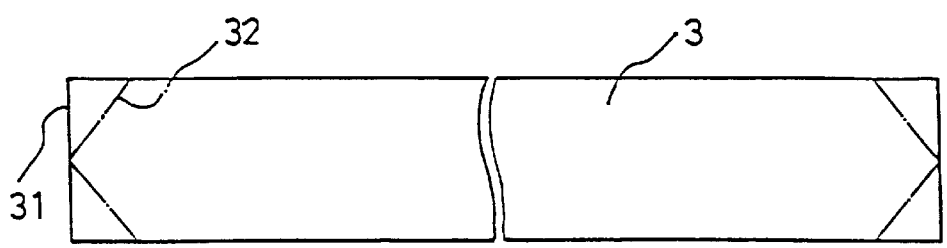
FIG. 8 is a plane view illustrating the cutting operation of the typical surfboard.

Referring next to FIGS. 3 and 4, a second mold device 60 includes an upper mold 61 and a lower mold 62 each includes a mold cavity 611, 621 having tapered side portions 64 corresponding to the tapered sides 22 of the surfboard 20.

The molds 61, 62 each includes a surface 63 for contacting and engaging with each other. The mold cavities 611, 621 include a volume about 2 to 3 times greater than that of the prototype 50 for allowing the prototype 50 to be expanded to a size 2 or 3 times greater than the size before the second time foamable process. The molds 61, 62 each includes a number of passages 65 for receiving heating medium and for forming a heating device that may heat the molds 61, 62 and the prototype 50. Two or more fasteners 80 may engage with two pairs of extensions 81, 82 that may be extended from the molds 61, 62 for pressing the molds 61, 62 together. The fasteners 80 may be bolts or screws or the piston rods of the actuators, such as hydraulic or pneumatic cylinders.

The heating medium and/or the molds 61, 62 are preferably heated to a temperature ranging from 160° to 180° C., and preferably heated for 10 to 15 minutes. After being hot-pressed, the prototype 50 may foam and expand again in order to fill the mold cavities 611, 621 and in order to form the surfboard 20 having a solid outer peripheral portion. The surfboard 20 may also be easily formed with trademarks or flat or spatial patterns on the flat deck 24 without further painting or cutting or engraving processes. Cold water or cold air may then be supplied into the passages 65 for cooling the molds 61, 62 to a temperature ranging from 30° to 40° C. and for cooling the prototype 50 and for forming the surfboard as shown in FIG. 5.

It is to be noted that the surfboard 20 may be easily and quickly formed into the required shape having a smooth outer surface such that no organism may grow in the EVA material and such that no bad odor may be generated. The mold cavities 611, 621 may be machined to form any required shape corresponding to that of the surfboard.

Accordingly, the method in accordance with the present invention may be easily used for quickly making a surfboard without cutting the materials for forming the outer portion of the surfboard.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A method for making a surfboard, said method comprising:

providing and cutting a foamable material sheet into at least one panel, providing a first mold device having a mold cavity, engaging said at least one panel in said mold cavity of said first mold device, hot-pressing said at least one panel and heating said at least one panel and expanding said at least one panel to a prototype after said at least one panel is removed from said first mold device, providing a second mold device having a lower mold and an upper mold, said lower mold and said upper mold including a mold cavity having a size greater than that of said prototype for allowing said prototype to expand to a greater size, engaging said prototype in said mold cavity of said lower mold and said upper mold, hot-pressing said prototype and heating and foaming said prototype and filling said prototype in said mold cavity of said lower mold and said upper mold, and cooling said second mold device for forming said surfboard.

2. A method according to claim 1, wherein said mold cavity of said lower mold and said upper mold of said second mold device includes tapered side portions for forming tapered sides and tapered nose and tapered tail for said surfboard.

3. A method according to claim 1, wherein said method includes means for pressing said lower mold and said upper mold of said second mold device together and means for heating said lower mold and said upper mold of said second mold device.

4. A method according to claim 3, wherein said first mold device and said second mold device each includes a plurality of passages for receiving heating medium and for heating said at least one panel and said prototype.

5. A method according to claim 4, wherein said first mold device is heated to a temperature ranging from 150° to 170° C., and is heated for 30 to 40 minutes, and said second mold device is heated to a temperature ranging from 160° to 180° C., and is heated for 10 to 15 minutes.

6. A method according to claim 1, wherein said prototype includes a size 6 to 10 times greater than that of said at least one panel, and said surfboard includes a size 2 to 3 times greater than that of said prototype.

* * * * *